(12) United States Patent
Takabe et al.

(10) Patent No.: US 6,296,959 B2
(45) Date of Patent: Oct. 2, 2001

(54) AIR SUPPLY DEVICE FOR FUEL CELL

(75) Inventors: Shigeru Takabe, Sagamihara; Hideaki Komaki, Tokyo, both of (JP)

(73) Assignee: Ishikawajima-Harima Heavy Industries Co., Ltd., Tokyo (JP)

( * ) Notice: Subject to any disclaimer, the term of this patent is extended or adjusted under 35 U.S.C. 154(b) by 0 days.

(21) Appl. No.: 09/239,809

(22) Filed: Jan. 29, 1999

(30) Foreign Application Priority Data

Apr. 15, 1998 (JP) ................................................ 10-105079

(51) Int. Cl.[7] .............................. H01M 8/04; H01M 8/06
(52) U.S. Cl. ................................................. 429/26; 429/20
(58) Field of Search ............................... 429/12, 19, 22, 429/20, 26

(56) References Cited

U.S. PATENT DOCUMENTS

| | | | |
|---|---|---|---|
| 4,622,275 | * | 11/1986 | Noguchi et al. ........................ 429/19 |
| 5,417,051 | * | 5/1995 | Ankersmit et al. ................. 429/17 X |
| 5,541,014 | * | 7/1996 | Micheli et al. ......................... 429/19 |
| 5,900,329 | * | 5/1999 | Reiter et al. ............................ 429/17 |

FOREIGN PATENT DOCUMENTS

| | | |
|---|---|---|
| 09190830 A | 7/1997 | (JP) . |
| 09259914 A | 10/1997 | (JP) . |

* cited by examiner

Primary Examiner—Stephen Kalafut
Assistant Examiner—Jonathan Crepean
(74) Attorney, Agent, or Firm—Griffin & Szipl, P.C.

(57) ABSTRACT

An air supply device for a fuel cell is disclosed which is provided with a displacement compressor (10) for supplying pressurized air as an air source to a cathode through an air supply line connected to the cathode inlet side of the fuel cell (1) so that a burned gas obtained by burning an anode exhaust gas (AG) discharged from an anode of the fuel cell may be conducted to the intake side of an exhaust gas turbine (8) for driving the displacement compressor, and so that air may be supplied to the cathode (2) by driving the displacement compressor (10) with the exhaust gas turbine that operates with the burned gas of the anode exhaust gas. A heat exchanger (22) vaporizes fuel fed to the anode of the fuel cell. The heat exchanger takes in exhaust gas from the turbine and outputs a high temperature exhaust gas, which is conducted to the intake of the turbine.

9 Claims, 3 Drawing Sheets

AIR SUPPLY DEVICE FOR FUEL CELL

BACKGROUND OF THE INVENTION (i) Field of the Invention

The present invention relates to a fuel cell that directly converts chemical energy of a fuel into electrical energy, particularly to an air supply device for a fuel cell that supplies air as an oxidizing gas to the cathode (oxygen pole) side of the fuel cell.

(ii) Description of the Related Art

Fuel cells can be classified into phosphoric acid type, molten carbonate type, solid oxide type, and solid polymer electrolyte type on the basis of an electrolyte to be used. However, in all types of fuel cell, both the surfaces of an electrolyte plate or an electrolyte film are sandwiched between both the electrodes of the cathode (oxygen pole) and the anode (fuel pole). One cell is comprised with a cathode side to which air ($O_2$) as an oxidizing gas is supplied and an anode side to which hydrogen ($H_2$) as a fuel gas is supplied, and such several cells are laminated via each separator into a stack.

A turbo charger model shown in FIG. 1, which drives a compressor with an exhaust gas turbine, and a motor drive model shown in FIG. 2 which drives a compressor with a motor, are examples of conventional air supply devices for supplying air to the cathode side of the above fuel cells.

FIG. 1 is one example showing a turbo charger model used as an air supply device for a natural gas reforming molten carbonate fuel cell generator, with a reformer d mounted on the upper flow side of the fuel cell FC, in which both surfaces of electrolyte plate a are sandwiched between the two electrodes cathode b and anode c, in which cells that supply air A as an oxidizing gas to cathode b, and also supply fuel gas FG to the anode side c are laminated and stacked between separators. It is further equipped with a turbo charger e as a device for supplying air to cathode b comprising an exhaust gas turbine f and a compressor g which is driven by the exhaust gas turbine f. A cathode exhaust gas line h is connected to the intake side of the exhaust gas turbine f, and the exhaust gas turbine f is rotated by the cathode exhaust gas CG. An air supply line i connected to the output side of the compressor g is connected to the inlet side of the cathode b, and a branch line j, divided by the air supply line i is connected to the inlet side of the combustion chamber Co of the reformer d. The air A compressed by the compressor g is sent to the combustion chamber Co of the reformer d and to the cathode b. k is the burned exhaust gas line that conducts the burned exhaust gas discharged from the combustion chamber Co of the reformer d to the inlet side of cathode b; Re is the reforming chamber of reformer d; l is the reforming raw materials line that conducts the raw materials to the reforming chamber Re of the reformer d; m is the fuel gas line that conducts the fuel gas FG reformed in the reformer d to the inlet side of the anode c; n is the anode exhaust gas line that conducts the anode exhaust gas AG to the combustion chamber Co of the reformer d after the moisture had been extracted by the gas/water separator o.

FIG. 2, as opposed to the turbo charger model shown in FIG. 1, shows a device in which the compressor g is driven by the motor M. Compressor g is directly driven by motor M, and air A conducted from the inlet side of compressor g is pressurized and supplied to the fuel cell cathode through the output side as in FIG. 1.

In the turbo charger shown in FIG. 1, the exhaust gas turbine f is rotated by cathode exhaust gas discharged from cathode b, drives the compressor g. The relationship of the flow rate Q to the pressure P is as shown in FIG. 3: when the flow rate falls, the pressure also falls. Therefore there is the danger of surging in a low flow rate range, and one must adjust both the flow rate and the pressure.

In the motor driven model shown in FIG. 2, the problem is that the exhaust gas energy discharged from the fuel cell can not effectively be used as motive power for supplying air, and the electricity obtained from the fuel cell is used for driving motor M, and is thus wasted.

SUMMARY OF THE INVENTION

The present invention has been developed in order to solve the above problems, and an object of the present invention is to provide an air supply device for a fuel cell which is provided with a displacement compressor for supplying pressurized air as an air source to a cathode, and so that air may be supplied to the cathode by driving the displacement compressor with the exhaust gas turbine that operates with the burned gas of the anode exhaust gas. Further, instead of anode exhaust burned gas, a high temperature exhaust gas generated within the system can be conducted to the exhaust gas turbine.

By operating the exhaust gas turbine by burning anode exhaust gas discharged from the anode of the fuel cell and conducting it to the exhaust gas turbine, the energy of the anode exhaust burned gas can be effectively used as motive power to drive the displacement compressor that compresses the air. Or, by operating the exhaust gas turbine with high temperature exhaust gas generated within the system, the energy of the exhaust gas obtained in the system can be effectively used. Because it is a displacement compressor, there is no danger of generating a surge even at low flow rates.

Furthermore, by mounting a motor-generator to the displacement compressor shaft, one can also take out electricity as a generator, or assist the revolution of the displacement compressor.

Other objects and advantages to the present invention are described below with reference to the drawings.

DETAILED DESCRIPTION OF THE PREFERRED EMBODIMENTS

One embodiment of the present invention will be described with reference to the drawings.

Figure 1:
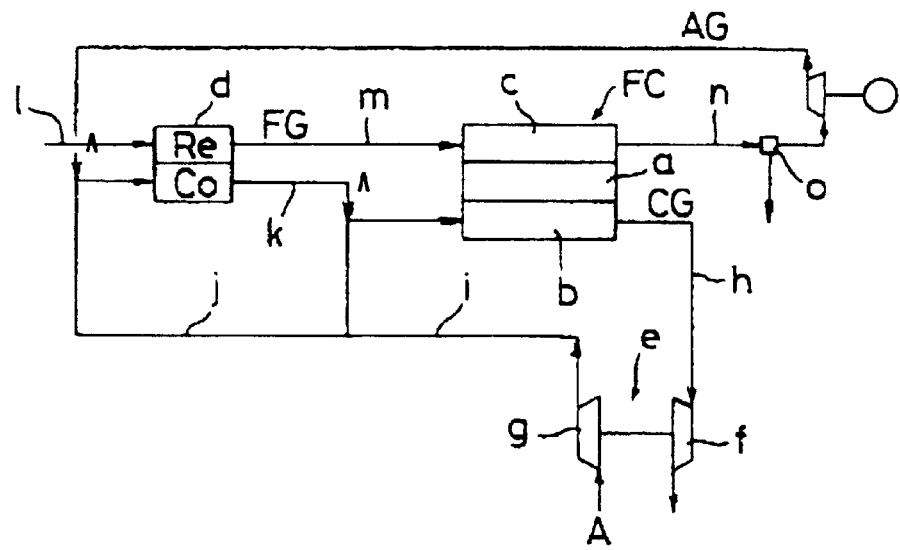
FIG. 1 is a schematic diagram of one example of a conventional device.
Figure 2:
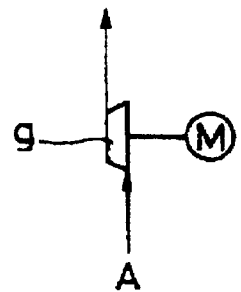
FIG. 2 is a schematic diagram of another example of a conventional device.
Figure 3:
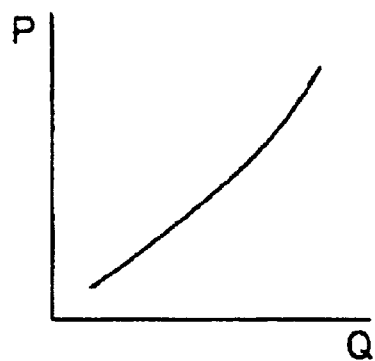
FIG. 3 shows the properties of pressure and flow rate in the case of a turbo charger.
Figure 4A:
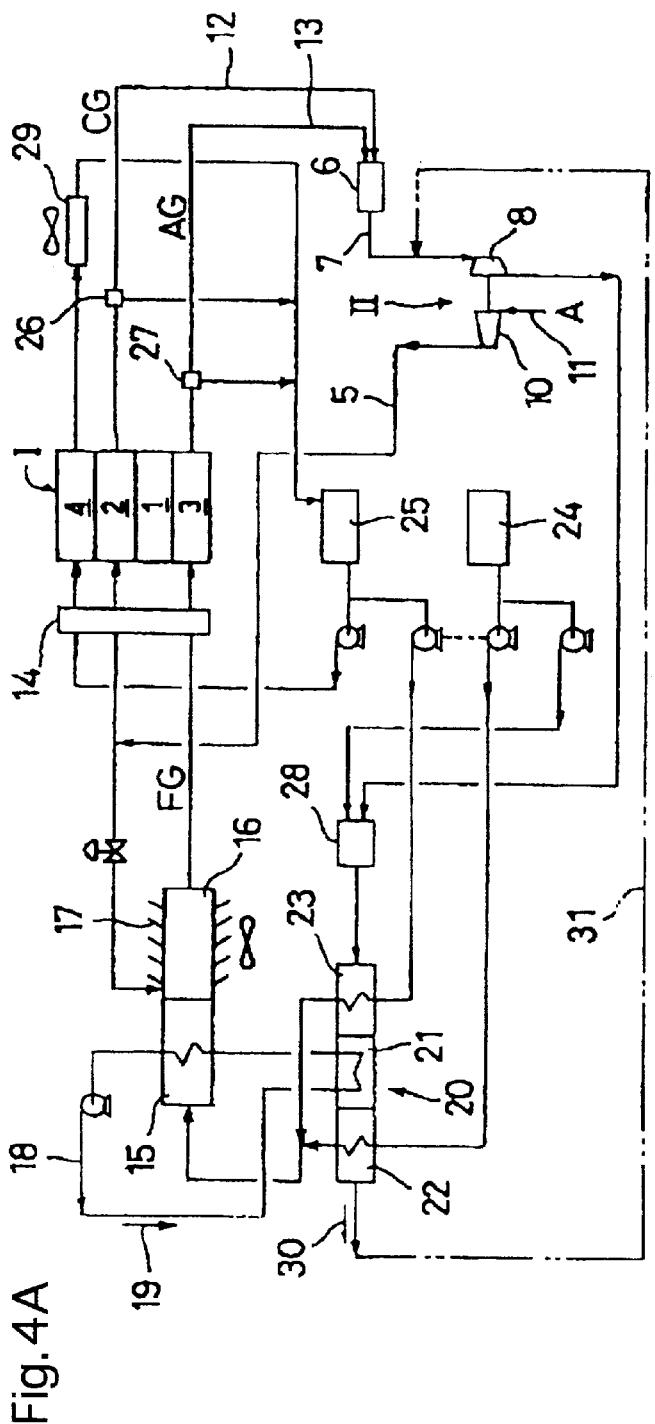
FIG. 4(A) is a system block diagram showing an example of a solid polymer electrolyte fuel cell generator that is one embodiment of the present invention.
Figure 4B:
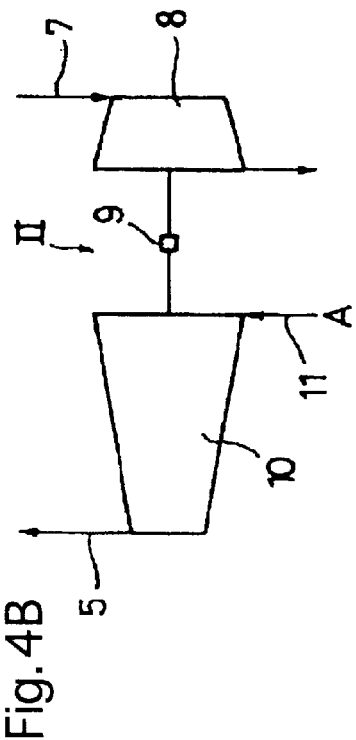
FIG. 4(B) is a schematic diagram of FIG. 4(A).

FIGS. 4(A) and 4(B) show one embodiment of the present invention used as a device for supplying air to the cathode of the fuel cell in a generator which uses a solid polymer electrolyte fuel cell, which is effective as a power source for automobiles because methanol is the raw material, electricity is generated at low temperatures of 100° C. or below, output density is high, and operation is done at low temperatures.

In other words, the solid polymer film 1 is sandwiched and layered between the two electrodes, the anode (fuel pole) 3 and the cathode (oxygen pole) 2 made of porous matter using a precious metal such as white gold as a catalyst. As one cell, they supply air A to the cathode 2 side as an oxidizing gas and fuel gas FG to the anode 3 side. Each cell is laminated and stacked up via separators. Because the reaction of the fuel cell is an exothermic reaction, in the present invention an air supply device is built between the air supply line 5 which is connected to the inlet side of the cathode 2 of the solid polymer electrolyte fuel cell I equipped with one cooler 4 for the several cells and the combustion gas line 7 on the outlet side of the catalytic combustor 6 that burns anode exhaust gas AG discharged from the anode 3 with cathode exhaust gas CG discharged from the cathode 2 and discharges it as high temperature (approximately 400° C.) burned gas, the compressor is driven using the energy of the anode exhaust burned gas and used as an air source, and air A is compressed and supplied to cathode 2.

The above air supply device 1I of the present invention, as shown enlarged in FIG. 4(B), comprises an exhaust gas turbine 8, and a displacement compressor 10 such as a mechanical drive supercharger linked to the exhaust gas turbine 8 through a decelerator 9. A combustion gas line 7 on the outlet side of the catalytic combustor 6 is connected to the intake side of the exhaust gas turbine 8, air intake pipe 11 is connected to the intake side of the displacement compressor 10. Cathode exhaust gas line 12 and anode exhaust gas line 13 are connected to the above catalytic combustor 6. Cathode exhaust gas CG discharged from the cathode 2 as well as anode exhaust gas AG from the anode 3 are conducted to the catalytic combustor 6 and burned. Exhaust gas turbine 8 is operated by the anode exhaust burned gas burned in the catalytic combustor 6, and the energy of the anode exhaust burned gas is used as motive power for supplying air with the displacement compressor 10.

The mechanical drive supercharger (e.g., a supercharger) used as the above displacement compressor 10 has a female rotor and a male rotor geared into each other and arranged in parallel inside the casing. By rotating both rotors, the air taken in from one side is compressed as it is moved along the shaft and discharged from the other side. A ryshorm compressor with a similar construction may also be used as the displacement compressor 10.

This kind of displacement compressor 10 is an advantage because it can supply air of comparatively high pressurization in one step compression.

In FIG. 4(A), 14 is a humidifier, 15 is a reformer equipped with a shift converter function, 16 is a CO remover placed so that it is cooled by air-cooling fin 17, 18 is a heat medium circulation fins that circulates heat transfer medium 19 supplying heat to reformer 15, 20 is a hybrid heat exchanger comprised with a single unit composed of heat transfer medium heater 21, methanol evaporator 22, and steam generator 23, 24 is a methanol tank, 25 is a water tank, 26 & 27 are gas/water separators, 28 is a combustor for start up, and 29 is a cooler.

Figure 5:
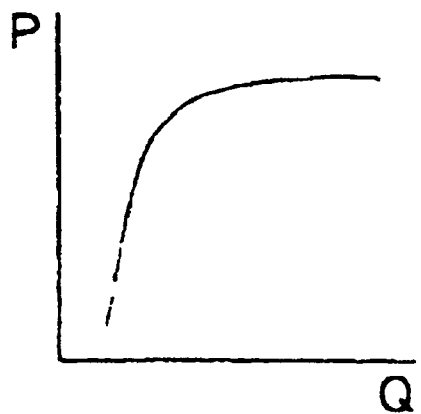
FIG. 5 shows the properties of pressure and flow rate in a mechanical drive supercharger used as displacement compressor in the present invention.

In the embodiment shown in FIGS. 4(A) and 4(B) anode exhaust gas AG discharged from the anode 3 of the solid polymer electrolyte fuel cell I is conducted to the catalytic combustor 6 along with cathode exhaust gas CG discharged from the cathode 2 and burned. The burned gas of approximately 400° C. is sent through the burned gas line 7 from the catalytic combustor 6 and supplied to the exhaust gas turbine 8 through the intake side. In this way, the displacement compressor 10 can be driven as an air source which is operated by exhaust gas turbine 8 with anode exhaust burned gas, compresses air A and supplies it to cathode 2, and the energy from the burned gas can be used effectively as motive power to drive the air source by conducting the above anode exhaust burned gas to the exhaust gas turbine. Given the relationship between the pressure and flow rate for the above displacement compressor as shown in FIG. 5, pressure P does not change even when flow rate Q is low in a fixed pressure range, and there is no danger of surging even at low flow rates.

The above embodiment describes a device in which the burned gas of approximately 400° C. obtained by burning anode exhaust gas AG and cathode exhaust gas CG in the catalytic combustor 6 is conducted to an exhaust gas turbine 8 causing the exhaust gas turbine 8 to rotate. However, high temperature exhaust gas 30 generated within the system such as the approximately 300° C. exhaust gas that comes from methanol evaporator 22 of the compound heat exchanger 20 in FIG. 4(A) can be conducted to the intake side of the exhaust gas turbine 8. This is possible as shown in the two-dot chain line by connecting the exhaust gas line 31 on the outlet side of methanol evaporator 22 to the inlet side of the exhaust gas turbine 8.

In this way, the energy of the exhaust gas released in vain can be used as motive power for the displacement compressor 10 by conducting the exhaust gas which has a temperature of 300° C., using methanol evaporation, to the exhaust gas turbine 8, and pressurized air can be supplied to the cathode 2. Further, when the exhaust gas from the methanol evaporation is used, the gas burned in the catalytic combustor 6 can be used effectively.

Figure 6:
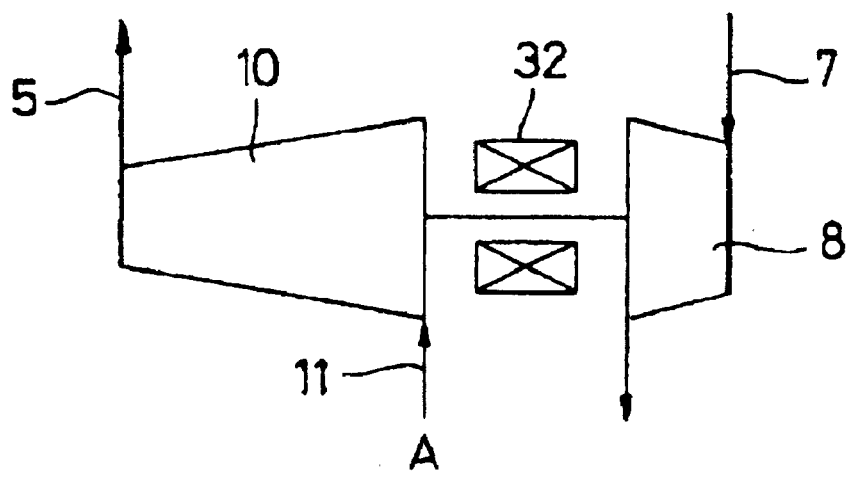
FIG. 6 is a schematic view of another embodiment of the present invention.

FIG. 6 shows another embodiment of the present invention. This is a construction in which a motor-generator 32 is mounted on the shaft of the displacement compressor 10 in a construction like the one shown in FIG. 4(B) in which the displacement compressor 10 is driven by an exhaust gas turbine 8.

With this kind of construction, if the power generated by the exhaust gas turbine which drives displacement compressor 10 and air source to supply air to the cathode 2 of the fuel cell I is sufficient, energy recovery can be carried out by generating electricity. When the anode exhaust burned gas supplied to the exhaust gas turbine 8 at start up cannot be used, or if it is necessary to supply a large amount of air from the displacement compressor during operation and the exhaust gas turbine 8 alone is insufficient for motive power, the motor-generator 32 can be used as a driving device to drive the displacement compressor 10 and assist in revolution.

The above embodiment shows a solid polymer electrolyte fuel cell as a fuel cell and an effective power source for an automobile, but it can of course be applied to other types of fuel cells. Furthermore, FIG. 4(A) shows one example of a generator system construction, but this is not limited to the one shown. For example, in FIG. 4(A), the reformer and the shift converter are established separately, the reformer is operated at 250° C., the methanol evaporator and the steam generator are set up separately, and the burned gas obtained by burning the anode exhaust gas with the cathode exhaust gas are used for heat in the reformer. All such things are optional.

As mentioned above, with the air supply device for fuel cells of the present invention, a displacement compressor is used as an air source to supply air to the cathode of the fuel cell, and motive energy that drives the displacement compressor is taken from the exhaust gas turbine. Fuel cell exhaust gas energy can be effectively used in the exhaust gas turbine because either high temperature anode exhaust burned gas or high temperature gas generated within the generator system is conducted to the exhaust gas turbine, and the energy of these gases is used as motive power for air supply. Comparatively high pressure pressurized air can be supplied to the cathode because the displacement compressor is used as an air source and driven by the exhaust gas turbine. Further, there are no problems such as surging even at low flow rates, and it is easy to control. In addition, one can achieve other superior effects by mounting a motor-generator on the displacement compressor shaft for such things as to assist the rotation of the displacement compressor at times such as when motive power can not be obtained from the exhaust gas turbine, such as at start up, or when much air is necessary, or as a generator to generate electricity in the reverse case, such as when the motive power of the exhaust gas turbine is sufficient or when only small amounts of air are necessary.

The present invention has been described in accordance with several preferred embodiments, but it should be understood that the scope of rights implied by the present invention is not limited to these embodiments. On the contrary, the scope of rights of the present invention includes all revisions, corrections, and similar devices covered by the attached claims.

What is claimed is:

1. An air supply device for a fuel cell, having a cathode with an inlet and an exhaust and an anode with an inlet and an exhaust, comprising:
   a displacement compressor for supplying pressurized air as an air source to the cathode;
   an exhaust gas turbine having an intake and an exhaust and operably connected to drive the displacement compressor;
   an air supply line connected to the cathode inlet of the fuel cell whereby air is supplied to the cathode inlet from the displacement compressor, and wherein the exhaust gas turbine is operably connected to the exhaust of the anode to operate with anode exhaust gas; and
   a heat exchanger connected to vaporize fuel fed to the inlet of the anode of the fuel cell, wherein the heat exchanger is connected to take in gas from the exhaust of the exhaust gas turbine and produce high temperature exhaust gas, and wherein the high temperature exhaust gas produced by the heat exchanger is conducted to the intake of the exhaust gas turbine.

2. The air supply device for a fuel cell according to claim 1, wherein said displacement compressor further comprises a shaft, said device further comprising a motor-generator mounted on the shaft of the displacement compressor.

3. An air supply device for a fuel cell, having a cathode with an inlet and an outlet and an anode with an inlet and an outlet, a fuel source and a water source, comprising:
   a compressor connected to supply pressurized air to said cathode;
   a catalytic combustor having, an intake connected to take in and burn anode exhaust gas discharged from the outlet of the anode with cathode exhaust gas discharged from the outlet of the cathode, and an outlet to exhaust burned gas;
   an exhaust gas turbine having an intake connected to take in burned gas from the catalytic combustor, and an outlet to exhaust turbine exhaust gas, said turbine being operably connected to drive the compressor;
   a start-up combustor having an intake connected to take in turbine exhaust gas and fuel from the fuel source, and an outlet to exhaust high temperature exhaust gas; and
   a heat exchanger having an inlet connected to take in high temperature exhaust gas from the start-up combustor, and an outlet to exhaust high temperature exhaust gas, wherein the outlet of the heat exchanger is operably connected to the inlet of the exhaust gas turbine, wherein the heat exchanger is operably connected to the fuel source to take in and evaporate fuel and operably connected to output evaporated fuel to the anode, and wherein the heat exchanger is operably connected to the water source to generate steam and operably connected to output steam to the anode along with evaporated fuel.

4. An air supply device according to claim 3, further comprising:
   a reformer operably connected to take in steam and evaporated fuel output from the heat exchanger and to output reformed fuel gas to the anode; and
   a heat transfer circuit operably connected to the reformer and the heat exchanger to circulate heat transfer medium from the heat exchanger to the reformer.

5. The air supply device for a fuel cell according to claim 3, further comprising a motor generator operably connected to be driven by the displacement compressor.

6. The air supply device for a fuel cell according to claim 4, further comprising a motor generator operably connected to be driven by the displacement compressor.

7. The air supply device for a fuel cell according to claim 3, further comprising a cooler connected to cool said fuel cell with water circulated from said water source.

8. The air supply device for a fuel cell according to claim 4, further comprising a cooler connected to cool said fuel cell with water circulated from said water source.

9. The air supply device for a fuel cell according to claim 4, further comprising a CO remover disposed to remove CO from fuel gas output from said reformer.

* * * * *